March 28, 1967     T. B. GUNDERMAN     3,311,787
TRANSISTORIZED CIRCUIT BREAKER
Filed April 9, 1964
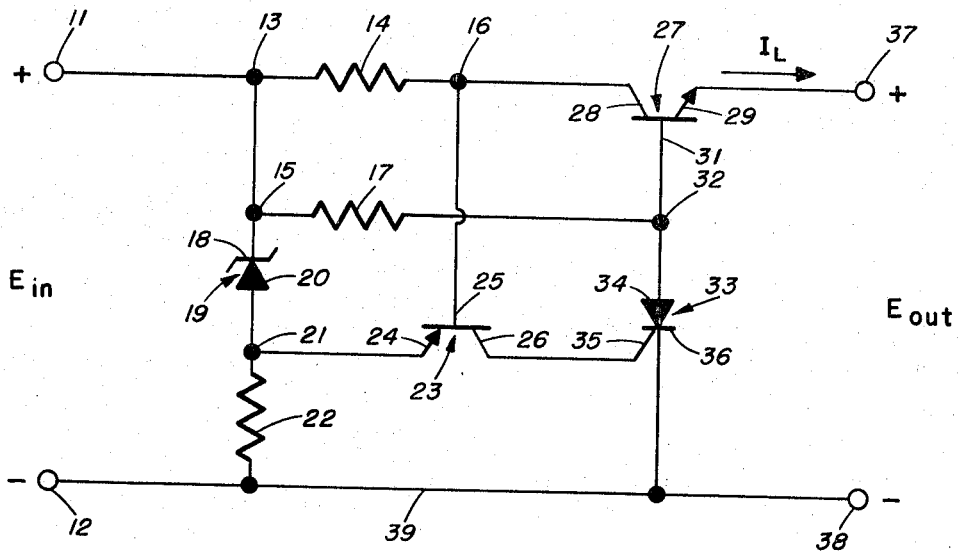
INVENTOR
TRACY B. GUNDERMAN
BY *Claude Funkhouser*
ATTORNEY

United States Patent Office 3,311,787
Patented Mar. 28, 1967

3,311,787
TRANSISTORIZED CIRCUIT BREAKER
Tracy B. Gunderman, Clinton, N.Y., assignor, by mesne assignments, to the United States of America as represented by the Secretary of the Navy
Filed Apr. 9, 1964, Ser. No. 358,675
6 Claims. (Cl. 317—33)

This invention relates to an electronic voltage regulator circuit and, more particularly, to a transistorized voltage regulator circuit for protecting electronic elements of a system from damage which may occur to them due to overloads of current or voltage.

Conventional overload devices such as fuses and circuit breakers have been wholly unsatisfactory as protective devices for electronic systems which need fast acting or short time constant circuit breaking action to prevent damage to circuit elements from overloads.

The fuse is an expendable device for opening an electric circuit whenever the current therein becomes excessive. It consists principally of a section of fusible element of such properties and of such physical proportions that excessive current flow through the element will melt it and thereby sever the circuit. The time required to melt the element depends upon the value of current flow and also depends upon the size, shape and material of the fusible element. At best, the fuse is a slow-acting device which is totally inadequate for circuitry systems which require fast-acting and reliable opening of the source circuit upon a predetermined maximum current flow through the system. The circuit breaker is a mechanical device which opens an electric circuit whenever excessive current flows through the circuit. A circuit breaker is much faster in opening a circuit than the fuse but it is still considered slow-acting for the required protection of certain types of electronic circuit systems. Further, the circuit breakers, by their inherent characteristics, require a device which is usually bulky, mechanically complex and expensive.

The electronic circuit breaker of the present invention overcomes the disadvantages of the prior art devices by providing a fast-acting, reliable and inexpensive circuit breaking device which opens the circuit on a predetermined level of flow of current therethrough. The circuit connects the source of potential to the load and causes a substantially open circuit to effectively remove the potential source from the load automatically upon receipt of high current flow. The instant circuit provides a fast-acting, completely electronic switch of diodes and transistors that open almost instantaneously.

An object of the present invention is to provide an improved overload protective device.

Another object of the present invention is to provide a completely electronic switch for use as a circuit breaker.

Still another object of the present invention is the provision of a circuit breaker that automatically connects and disconnects a source of potential to a utilization circuit.

Still another object of the present invention is the provision of an electronic circuit breaker configuration that is fast-acting, reliable and inexpensive.

Other objects, advantages and novel features of the invention will become apparent from the following detailed description of the invention when considered in conjunction with the accompanying drawings wherein:

The drawing shows a schematic diagram of the invention.

In accordance with the preferred embodiment of the present invention, short circuit or overload conditions are provided for an electronic system's circuit elements in series with a source of potential by including a current limiting protective circuit between the source and the system. A resistor-transistor combination is connected in series with one side of the source line and the transistor is biased by the amount of load current flow to be either in the conducting or the non-conducting state. When the current through the transistor reaches a predetermined level, the transistor is caused to be biased so that it is in its cut-off or non-conducting state. This action effectively and quickly opens the circuit between the source and the system.

With reference to the only figure in the drawing, there is illustrated a NPN transistor 27 having base 31, emitter 29 and collector 28 electrodes, respectively. The emitter-collector circuit is connected in series with the positive side of the source line. The source, not shown in the drawing, but indicated as $E_{in}$ is connected across input terminals 11 and 12, respectively. Terminal 11, which represents the positive line of the source, connects to junction 13 through series resistor 14 which is tied between junction 13 and junction 16. The collector 28 of transistor 27 connects to junction 16 and its emitter 29 is tied to output terminal 37. Electrically connected in parallel with the source is a circuit network consisting of a Zener diode 19 and a series resistor 22. The cathode 18 of diode 19 is connected to junction 13 via junction 15 and its anode 20 is connected to junction 21. Resistor 22 electrically connects junction 21 to common negative line 39 which ties the input terminal 12 and output terminal 38 together. The base 31 of transistor 27 is connected to line 39 via junction 32 and silicon controlled rectifier 33, hereinafter referred to as SCR. The anode 34 of SCR 33 connects to junction 32 and its cathode 36 is connected to common line 39. A base resistor 17 is connected across junction 15 and junction 32. A second transistor 23, shown as an NPN type, is connected in circuitry arrangement across the positive line and the common negative line 39 by having its base 25 tied to junction 16 located between resistor 14 and collector 28 and its emitter 24 electrically connected to line 39 through junction 21 and resistor 22. The collector 26 of transistor 25 electrically connects to line 39 through electrode 35 and cathode 36 of SCR 33.

The switching action for opening and closing the circuit takes place by operation of the transistor 27 in a saturated or cut-off condition. In the saturated condition the collector-emitter circuit provides a low voltage drop across the collector-emitter, thus a low impedance path exists through the positive line and current flow is unhindered to the load or electronic system's circuit, not shown.

The voltage reference network, Zener diode 19 and resistor 22 are connected in parallel relationship with the potential source to provide a constant potential at junction 15 and base 31 of transistor 27.

The control network for causing the transistor 27 to change from its conductive to non-conductive state and thus control the conductivity of the collector-emitter circuit is made up of transistor 23 and SCR 33. Transistor 23 is changed from conducting to non-conducting by a change in potential drop across series resistor 14 which changes the constant reference source of potential maintained at junction 15 by the diode resistor network.

Under conditions of normal operation the load current, indicated as $I_L$, that is passing through resistor 14 and the collector-emitter circuit of transistor 27 produces a potential drop across resistor 14 which is less than the potential at the junction 15. This potential, of course, being maintained by the voltage drop across the Zener diode and resistor 22 network. As long as the potential drop across resistor 14 remains at a lower value than the potential across the Zener diode 19, the control transistor 23 will be back-biased and non-conducting. In this state, transistor 23 will supply no current to the SCR 33 and it also will be non-conducting. The current flow through resistor 17 to the base 31 insures that transistor 37 is in its saturated condition, thus providing a low impedance in the collector-emitter circuit.

Whenever short circuit or an overload condition occurs in the utilization circuit or load circuit, not shown, which is connected between output terminals 37 and 38, the load current $I_L$ will increase and this action increases the voltage drop across resistor 14. This voltage drop will increase until it equals the voltage drop across the Zener diode 19. As the load current increases further, transistor 23 becomes forward biased and starts to conduct. This causes collector current to flow which passes to electrode 35 of SCR 33. This current gates or starts the SCR 33 into conduction which brings its anode voltage very close to ground potential. Since the anode voltage also controls the voltage at junction 32, the base voltage also drops causing the emitter voltage of transistor 27 to drop very close to zero. Under this condition, transistor 27 is cut-off and there is no further load current $I_L$ to the load. The output terminal voltage at terminal 37 goes to zero and SCR 33 remains conducting. The cut-off occurs in a very short period of time, thus, as the load current drops, transistor 23 again becomes back-biased because of lowering of the voltage drop across resistor 14. This removes the gate current from SCR 33 but SCR 33 will remain conducting as anode current flows. This current is known as "holding current." The necessary anode current is supplied to SCR 33 by the input voltage at junction 11; the current circuit being from junction 11 via resistor 17 to junction 32 and through SCR 33 to negative line 39. This action causes transistor to dissipate very little power. Also, since transistor 27 is either in its cut-off or saturated state, it also dissipates very little power.

The circuit can be reset by momentarily interrupting the input voltage at junction 11 by means not shown. This causes removal of the hold current and allows transistor 27 to conduct when the input voltage is reapplied to terminal 11. If an overload still exists, the breaker will again trip out in the manner as explained above.

If the polarity of the output voltage is to be reversed from that shown in the drawing, a PNP transistor may be substituted for transistor 27 and transistor 23 is reconnected so that its base is connected to junction 21 and its emitter is connected to junction 16. Also, the SCR 33 and Zener diode 19 would have to be reversed from the way they are shown in the drawing in order to have the proper polarities on their anode and cathode electrodes.

A transistorized circuit breaker in accordance with the present invention is thus seen to be eminently suitable for use where a source must be rapidly disconnected from a load circuit. The circuit once normal conditions are restored, in the load circuit, immediately operates to provide a low impedance path for the load current and the circuit operates until an overload occurs again.

Obviously many modifications and variations of the present invention are possible in the light of the above teachings. It is therefore to be understood that within the scope of the appended claims the invention may be practiced otherwise than as specifically described.

I claim:
1. A circuit breaker system that opens automatically upon changes in load current conditions comprising:
   a controlled semiconductor device;
   a series resistor for providing a varying voltage drop indicative of load current flow;
   said series resistor and said semiconductor connected in series relationship in one side of source line;
   a voltage reference network connected in parallel relationship with a source input voltage;
   a control semiconductor device connected in circuitry arrangement with voltage reference network for providing control voltage to said controlled semiconductor; and
   a silicon controlled rectifier connected in circuitry arrangement with said control semiconductor device and controlled semiconductor device;
   whereby the control semiconductor device remains non-conducting whenever the load current passing through the series resistor produces a voltage drop across the series resistor that is below a predetermined level that is set by the voltage reference network and the control semiconductor device and silicon controlled rectifier is conducting whenever the voltage drop across the series resistor has exceeded the value set by the voltage reference source.

2. The circuit breaker system as claimed in claim 1 wherein the controlled semiconductor device and control semiconductor device are transistors.

3. The circuit breaker system as claimed in claim 1 wherein the voltage reference network is a Zener diode and resistor connected in series circuitry arrangement.

4. A circuit breaker system that opens automatically upon change in load current conditions comprising:
   a pair of input terminals for connection to a source of potential;
   a pair of output terminals for connection to a utilization circuit;
   a controlled transistor having a base, emitter and collector electrodes;
   a series resistor for providing a varying voltage drop indicative of load current flow;
   said series resistor and said transistor's collector and emitter electrodes connected in series relationship between first one of said pair of input terminals and the first one of said pair of output terminals;
   a common lead connection between said second one of said pair of input terminals and said second pair of output terminals;
   a voltage reference network connected in parallel relationship with said pair of input terminals;
   said voltage reference network having a diode and resistor connected in series relationship;
   a control transistor having a base, emitter and collector electrodes;
   said control transistor's base electrically coupled to said collector of the controlled transistor;
   a silicon controlled rectifier having anode, gate and cathode electrodes;
   said anode connected to said base of the controlled transistor and said cathode connected to said common lead;
   said emitter and collector of said controlled transistor connected in circuitry arrangement between said voltage reference network and said gate electrode of the silicon controlled rectifier; and
   a base resistor electrically connected to the first one of said input terminals and said base of said control transistor for insuring saturation of said controlled transistor and for providing holding current to the silicon controlled rectifier once the gate current is removed;
   whereby the control transistor remains non-conducting whenever the load current passing through the series resistor produces a voltage drop across the series resistor that is below a predetermined level that is set by the voltage reference network and the control transistor is conducting whenever the voltage drop across the series resistor exceeds the value set by the voltage reference source.

5. The circuit breaker system as claimed in claim 4 wherein said control transistor's emitter is connected in circuitry relationship with said anode of said diode.

6. The circuit breaker system as claimed in claim 5 wherein the diode is a Zener diode.

(References on following page)

References Cited by the Examiner

UNITED STATES PATENTS

| | | | |
|---|---|---|---|
| 2,888,633 | 5/1959 | Carter | 317—33 X |
| 3,026,469 | 3/1962 | Wilbur et al. | 317—33 X |
| 3,101,441 | 8/1963 | Curry | 317—33 X |
| 3,192,441 | 6/1965 | Wright | 317—33 |
| 3,204,175 | 8/1965 | Kuriger | 317—22 X |
| 3,218,542 | 11/1965 | Taylor. | |

FOREIGN PATENTS

| | | |
|---|---|---|
| 1,300,021 | 6/1962 | France. |

MILTON O. HIRSHFIELD, *Primary Examiner.*

R. V. LUPO, *Assistant Examiner.*